United States Patent
Yasuda

(10) Patent No.: US 8,279,324 B2
(45) Date of Patent: Oct. 2, 2012

(54) FOCUS CONTROL APPARATUS, IMAGE SENSING APPARATUS, AND CONTROL METHOD THEREFOR

(75) Inventor: Hitoshi Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 12/518,322

(22) PCT Filed: Jul. 9, 2008

(86) PCT No.: PCT/JP2008/062773
§ 371 (c)(1),
(2), (4) Date: Jun. 9, 2009

(87) PCT Pub. No.: WO2009/008541
PCT Pub. Date: Jan. 15, 2009

(65) Prior Publication Data
US 2010/0013981 A1 Jan. 21, 2010

(30) Foreign Application Priority Data
Jul. 10, 2007 (JP) .................. 2007-181116

(51) Int. Cl.
*H04N 5/232* (2006.01)
(52) U.S. Cl. ........ 348/345; 348/346; 348/347; 348/348; 348/349; 348/350; 348/351; 348/352; 348/353; 348/354; 348/355; 348/356
(58) Field of Classification Search .......... 348/345–348, 348/349–356; 396/72–82
See application file for complete search history.

(56) References Cited

U.S. PATENT DOCUMENTS

| | | | |
|---|---|---|---|
| 5,003,339 | A | 3/1991 | Kikuchi et al. |
| 6,249,317 | B1 * | 6/2001 | Hashimoto et al. ............ 348/364 |
| 2004/0090551 | A1 | 5/2004 | Yata |
| 2004/0263674 | A1 * | 12/2004 | Koreki .......................... 348/345 |
| 2006/0072915 | A1 | 4/2006 | Onozawa |
| 2006/0182433 | A1 * | 8/2006 | Kawahara et al. ............ 396/123 |
| 2006/0238622 | A1 * | 10/2006 | Shimosato ................. 348/220.1 |

FOREIGN PATENT DOCUMENTS

| | | |
|---|---|---|
| JP | 02-217075 A | 8/1990 |
| JP | 02217075 A * | 8/1990 |
| JP | 2001-215403 A | 8/2001 |
| JP | 2002-162559 A | 6/2002 |
| JP | 2006-101186 A | 4/2006 |
| JP | 2006-227080 A | 8/2006 |

* cited by examiner

*Primary Examiner* — Jason Chan
*Assistant Examiner* — Yih-Sien Kao
(74) *Attorney, Agent, or Firm* — Cowan, Liebowitz & Latman, P.C.

(57) ABSTRACT

A control method of detecting an object image to be focused from a sensed image, setting a focus detection area in detecting an in-focus state of a photographing optical system, and exercising control such that the photographing optical system is moved based on a signal output in the focus detection area to carry out focus control, wherein, in the setting of the focus detection area, a first focus detection area corresponding to an object to be focused detected from the sensed image and a second focus detection area which is larger than the first focus detection area are set, and in the focus control, control is exercised such that the photographing optical system is moved based on output signals in the set first and second focus detection areas.

10 Claims, 4 Drawing Sheets

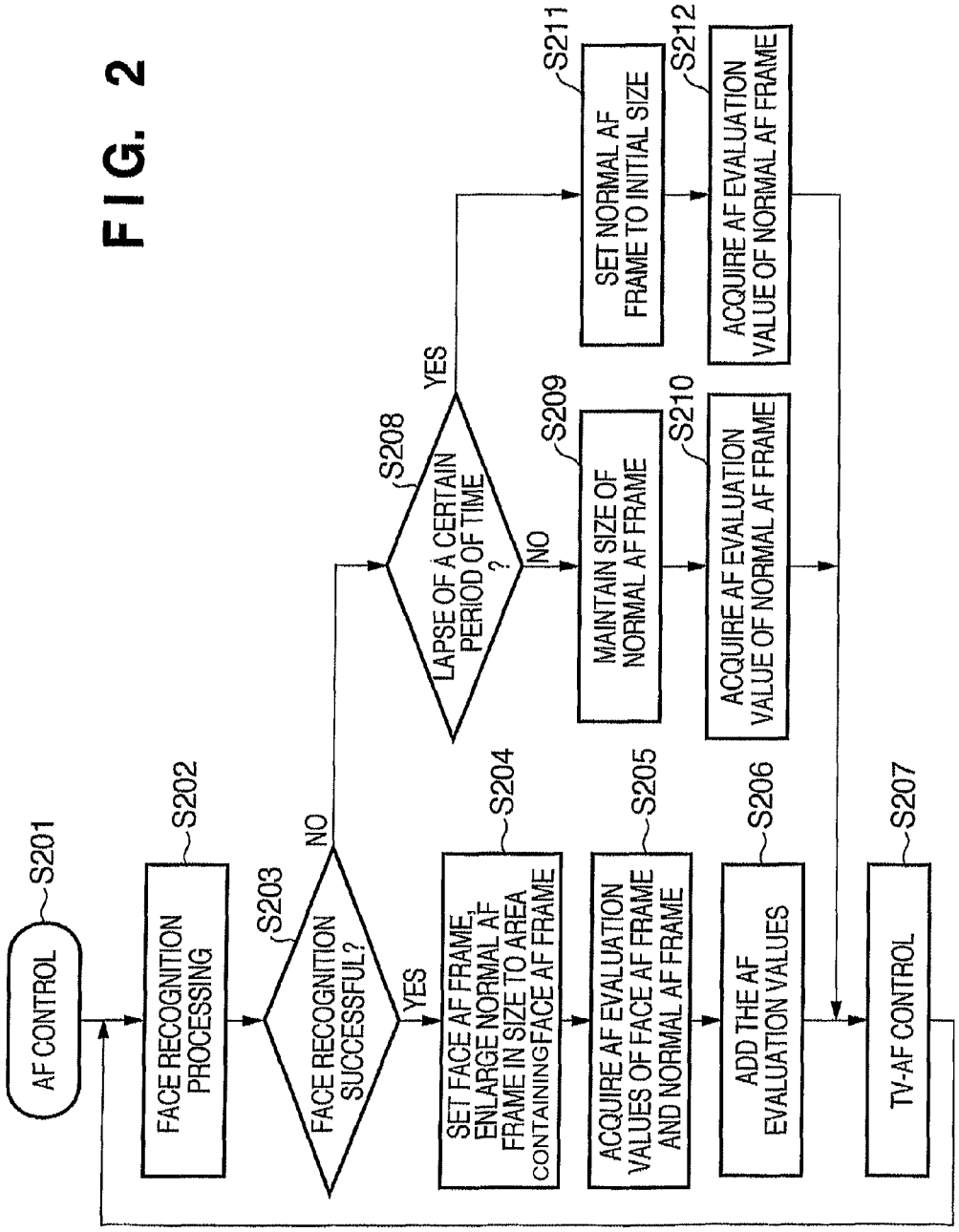

FOCUS CONTROL APPARATUS, IMAGE SENSING APPARATUS, AND CONTROL METHOD THEREFOR

CROSS-REFERENCE TO RELATED APPLICATIONS

This application is a national stage application of International Application No. PCT/JP2008/062773, filed Sep. 7, 2008, whose benefit is claimed and which claims the benefit of Japanese Patent Application No. 2007-181116, filed Jul. 10, 2007, whose benefit is also claimed.

TECHNICAL FIELD

The present invention relates to a focus control apparatus with a focus control function, an image sensing apparatus including the focus control apparatus, and a control method therefor.

BACKGROUND ART

In auto-focus (AF) control of a video camera or the like, a so-called TV-AF system is the most common way of generating an AF evaluation value indicative of the sharpness (contrast state) of video signals generated by an image sensor and searching for the position of a focus lens at which the AF evaluation value is at its maximum. However, in the case of photographing a person, for example, there has been a problem of failing to focus on the person as a main object, and focusing instead on the background in such a case that the background includes objects of high special frequency.

For the purpose of solving such a problem, image sensing apparatuses with a face recognition function are known. For example, there are proposed an image sensing apparatus (for example, Japanese Patent Laid-Open No. 2006-227080) in which a focus detection area for detecting a focus state is set in an area including a recognized face area to carry out focus detection in the set focus detection area, and an image sensing apparatus (for example, Japanese Patent Laid-Open No. 2001-215403) in which an eye of a person is detected to carry out focus detection for the eye.

However, in focus detection with the use of the face recognition function described above, the face may not be stably recognized depending, for example, on the effect of variations in the features of the face in the case of a person looking away, a person with his/her eye(s) closed, or the like, or on the effect of camera shake. Therefore, the stability of focusing may be reduced. Further, in a case in which the size of an object image varies or the size of an object image is small, the stability of focusing may be reduced. In particular, in the case of moving images, the effect is found to be significant since it is highly likely that a person is always moving. If the face of a person is always recognized, focusing on the person is more stable when focusing is carried out with the face area of the person specified as the area of focus detection. However, in a situation in which the face may or may not be recognized, the area for focus detection will be changed depending on whether the face is recognized or not, the AF evaluation value will vary, and stable focusing is thus unable to be carried out. Further, when the area from which an AF evaluation value is taken varies depending on variations in the size of an object image, or when the area from which an AF evaluation value is taken is too small in the case of a small object image, AF evaluation value signals are unable to be obtained stably, and it may be thus difficult to carry out focusing.

Further, in the case of the main object being not a person, similar problems will also occur in a case in which a focus detection area is set based on the results of detecting an object to carry out focus detection.

DISCLOSURE OF INVENTION

The present invention has been made in consideration of the above situation, and has as its object to provide a focus control apparatus, an image sensing apparatus, and a control method therefor, which are capable of maintaining a stable in-focus state even in the case of focusing on an object to be focused in moving images with the use of an object detection function.

According to the present invention, the foregoing object is attained by providing a focus control apparatus comprising: detection means for detecting an object image to be focused from a sensed image; setting means for setting an AF evaluation value detection area in the sensed image; and focus detection means for acquiring an AF evaluation value for adjusting a focus state of a photographing optical system based on a signal output from the AF evaluation value detection area, wherein the setting means sets a first AF evaluation value detection area corresponding to the object image detected by the detection means and a second AF evaluation value detection area that contains and is larger than the first AF evaluation value detection area, and wherein the focus detection means carries out computation using signal outputs in the first AF evaluation value detection area and the second AF evaluation value detection area to acquire the AF evaluation value for adjusting the focus state of the photographing optical system.

According to the present invention, the foregoing object is also attained by providing a focus control apparatus comprising: detection means for detecting an object image to be focused from a sensed image; setting means for setting an AF evaluation value detection area in the sensed image; and focus detection means for acquiring an AF evaluation value for adjusting a focus state of a photographing optical system based on a signal output from the AF evaluation value detection area, wherein the setting means sets a first AF evaluation value detection area tracking the object image detected by the detection means and a second AF evaluation value detection area not tracking the object image detected by the detection means, and wherein the focus detection means carries out computation using signal outputs in the first AF evaluation value detection area and the second AF evaluation value detection area to acquire the AF evaluation value for adjusting the focus state of the photographing optical system.

Further, the foregoing object is also attained by providing an image sensing apparatus comprising: image sensing means for photoelectrically converting an object image formed by the photographing optical system to output a sensed image; recording means for exercising control such that the sensed image obtained by using the image sensing means is recorded on a recording medium; and one of the foregoing focus control apparatus.

Furthermore, the foregoing object is also attained by providing a control method for a focus control apparatus, wherein, upon acquiring an AF evaluation value indicative of an in-focus state of a photographing optical system, setting a first AF evaluation value detection area corresponding to an object image to be focused detected from a sensed image and a second AF evaluation value detection area that contains and is larger than the first AF evaluation value detection area is set, and acquiring an AF evaluation value for adjusting a focus state of the photographing optical system by carrying out computation using signal outputs in the first AF evaluation value detection area and the second AF evaluation value detection area.

Further, according to the present invention, the foregoing object is also attained by providing a control method for a focus control apparatus, wherein, upon acquiring an AF evaluation value indicative of an in-focus state of a photographing optical system, setting a first AF evaluation value detection area tracking an object image to be focused detected from a sensed image and a second AF evaluation value detection area not tracking the detected object image are set, and acquiring an AF evaluation value for adjusting a focus state of the photographing optical system by carrying out computation using signal outputs in the first AF evaluation value detection area and the second AF evaluation value detection area.

Further, features of the present invention will become apparent from the following description of exemplary embodiments (with reference to the attached drawings).

BRIEF DESCRIPTION OF DRAWINGS

FIG. 2 is a flowchart showing processing carried out by a camera AF microcomputer according to an embodiment of the present invention;

BEST MODE FOR CARRYING OUT THE INVENTION

Preferred embodiments of the present invention will be described in detail in accordance with the accompanying drawings.

<Description of Apparatus>

Figure 1:
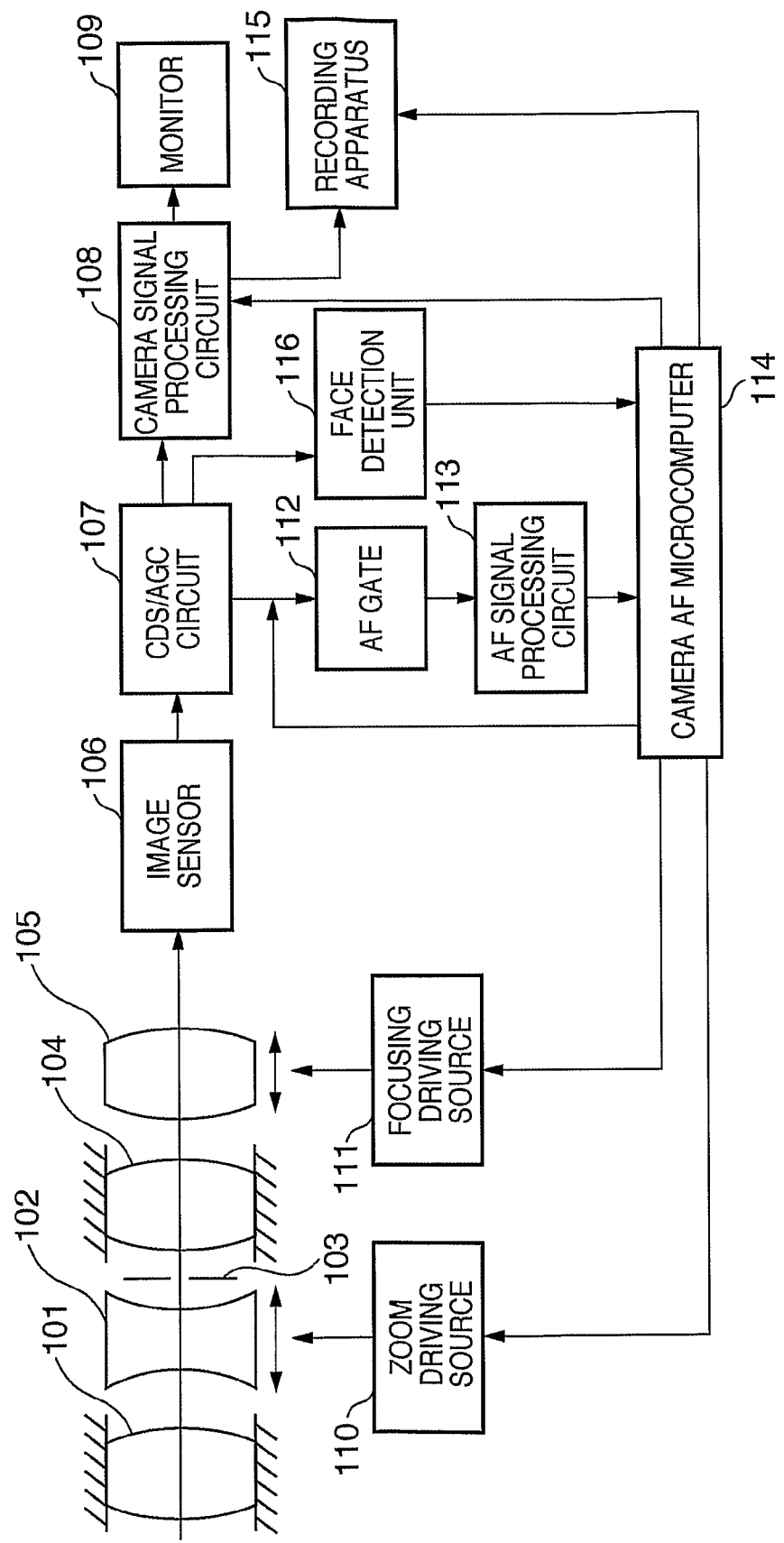
FIG. 1 is a block diagram illustrating the configuration of a video camera according to an embodiment of the present invention.

FIG. 1 shows the configuration of a video camera as an embodiment of the present invention. It is to be noted that although the video camera will be described in the present embodiment, the present invention can be applied to other apparatuses such as digital still camera and microscopes.

In FIG. 1, reference numerals 101, 102, and 103 denote a first fixed lens, a zoom lens that moves along an optical axis and carries out zooming, and an aperture, respectively. Further, reference numerals 104 and 105 denote a second fixed lens and a focus compensator lens (hereinafter, referred to as a focus lens) which has both a function of correcting a focal plane shift with zooming and a focusing (focus control) function. The first fixed lens 101, the zoom lens 102, the aperture 103, the second fixed lens 104, and the focus lens 105 constitute a photographing optical system.

Reference numeral 106 denotes an image sensor as a photoelectric conversion element composed of a CCD sensor or a CMOS sensor. Object images formed by the photographing optical system are photoelectrically converted by the image sensor 106. Reference numeral 107 denotes a CDS/AGC circuit that samples signal outputs from the image sensor 106 and subjects the signal outputs to gain adjustment.

Reference numeral 108 denotes a camera signal processing circuit, which subjects the signal outputs from the CDS/AGC circuit 107 to a variety of image processing to generate video signals. Reference numeral 109 denotes a monitor composed of an LCD or the like, which displays the video signals from the camera signal processing circuit 108. Reference numeral 115 denotes a recording apparatus, which records the video signals from the camera signal processing circuit 108 on a recording medium such as a magnetic tape, an optical disk, or a semiconductor memory.

Reference numeral 110 denotes a zoom driving source for moving the zoom lens 102. Reference numeral 111 denotes a focusing driving source for moving the focus lens 105. The zoom driving source 110 and the focusing driving source 111 are each composed of an actuator such as a stepping motor, a DC motor, a vibration motor, and a voice coil motor.

Reference numeral 112 denotes an AF gate that allows passage of only signals of an area to be used for focus detection from among signal outputs for all pixels from the CDS/AGC circuit 107.

An AF signal processing circuit 113 extracts a high frequency component, a luminance difference component (the difference between the maximum and minimum values of the luminance levels of the signals which have passed through the AF gate 112), and the like from the signals which have passed through the AF gate 112 to generate an AF evaluation value. The AF evaluation value is output to a camera/AF microcomputer 114. The AF evaluation value indicates the sharpness (contrast state) of video generated based on the signal outputs from the image sensor 106, but results in a signal indicative of the focus state of the photographing optical system because the sharpness varies depending on the focus state of the photographing optical system.

The camera/AF microcomputer 114 controls operation of the entire video camera, and also, based on the AF evaluation value, executes AF control in which the focusing driving source 111 is controlled to move the focus lens 105 and carry out focus control.

A face detection unit 116 subjects a sensed image to known face recognition processing, and detects face information on a person in the sensed image screen. The detection result is transmitted to the camera/AF microcomputer 114. The camera/AF microcomputer 114, based on the detection result, transmits information to the AF gate 112 such that the area to be used for focus detection is added to the position that includes the face area in the sensed image screen.

Further, as the face recognition processing, for example, there is a method in which a skin-color area is extracted from gray scale colors of each pixel represented by image data to detect the face depending on the degree to which the skin-color matches a face profile plate prepared in advance. Further, there are also methods disclosed such as a method in which face detection is carried out by using a well-known pattern recognition technique to extract facial features such as the eyes, nose, mouth, and the like. In a case where a plurality of faces are detected, a face having a larger size, located at a position closer to the center of the screen, and detected with higher reliability in face detection than other faces is determined as a main object (main face).

<AF Control Flow>

Next, AF control carried out by the camera/AF microcomputer 114 will be described with reference to FIG. 2. This AF control is performed in accordance with a computer program stored in the camera/AF microcomputer 114.

In step S201 represents the start of processing. In step S202, face information (the position of a face, the size of the face, and the reliability of face detection) is taken in from the face detection unit 116. In a case in which it is determined in step S203 that the face detection unit 116 succeeds in face detection, the processing proceeds to step S204; otherwise, processing proceeds to step S208.

In step S204, a face AF frame corresponding to the face information detected by the face detection unit 116 and a normal AF frame enlarged in size with its center fixed are set as AF frames (AF evaluation value detection areas), where the center of the face AF frame in the image may be either the center of a main face that is a detected main object or the center of the eyes, and the vertical and horizontal dimensions WID of the face AF frame are determined based on the size of the detected main face. The face AF frame is updated on an as-needed basis in response to the face information, and is set tracking the face, whereas the normal AF frame is enlarged in size to contain the face AF frame, and is set. In step S205, AF evaluation values for the face AF frame and normal AF frame are acquired. In step S206, each AF evaluation value is subjected to addition (computation) at a predetermined ratio to generate an AF evaluation value. In step S207, the AF evaluation value generated in step S206 is used to carry out AF control (i.e., control for moving the focus lens so as to always keep an in-focus state in the AF frame).

On the other hand, in step S208, it is determined whether or not a certain period of time elapses after failing to recognize the face, and the processing proceeds to step S209 in a case in which the certain period of time has not elapsed yet, or proceeds to step S211 in a case in which the certain period of time has elapsed. In step S209, the normal AF frame is maintained to match the size and position for the case of previously succeeding in face detection, and in step S210, an AF evaluation value for the normal AF frame is acquired. Then, in step S207, the AF evaluation value acquired in step S210 is used to carry out AF control.

On the other hand, the normal AF frame is set to the initial size in step S211. In step S212, an AF evaluation value for the normal AF frame is acquired. Then, in step S207, the AF evaluation value acquired in step S212 is used to carry out AF control.

<Setting of AF Frame>

Figure 3A:
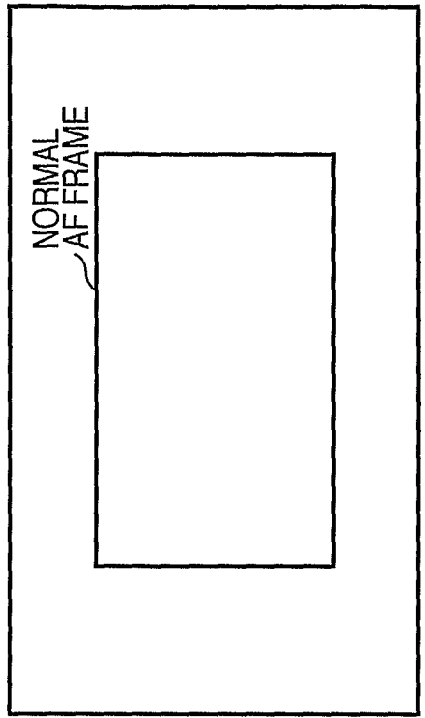
FIGS. 3A to 3D are diagrams illustrating control of setting AF frames according to an embodiment of the present invention.

Next, setting of the AF frames will be described with reference to FIGS. 3A to 3D. In an initial state, the normal AF frame is set near the center of a screen as shown in FIG. 3A. This setting is determined because a photographer generally tends to locate an object in the center of the screen. As shown in FIG. 3B, when the face AF frame is set at the face position in the sensed image screen, which is detected by the face recognition processing, the normal AF frame is enlarged with its center position fixed until it contains the face AF frame. The frames are overlapped in this way such that the face AF frame is included in the normal AF frame, thereby reducing variations in AF evaluation value when failure of face recognition causes the face AF frame to disappear leaving only the normal AF frame. It is to be noted that, in a case in which a plurality of faces are detected, face AF frames' for the respective faces are set. Alternatively, a face frame for the main object (main face) as described above is set.

Figure 3C:
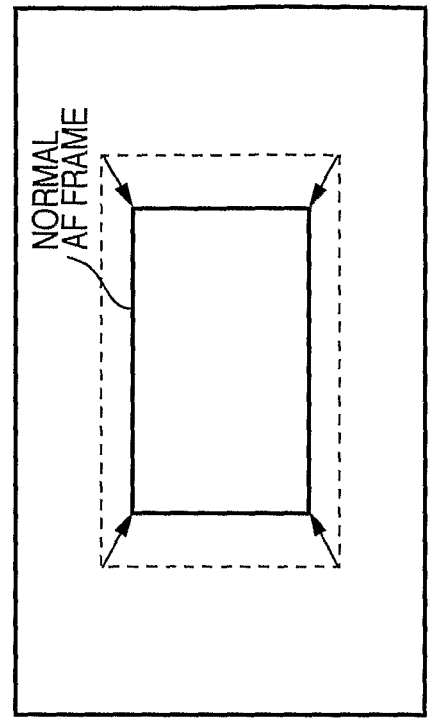
Figure 3B:
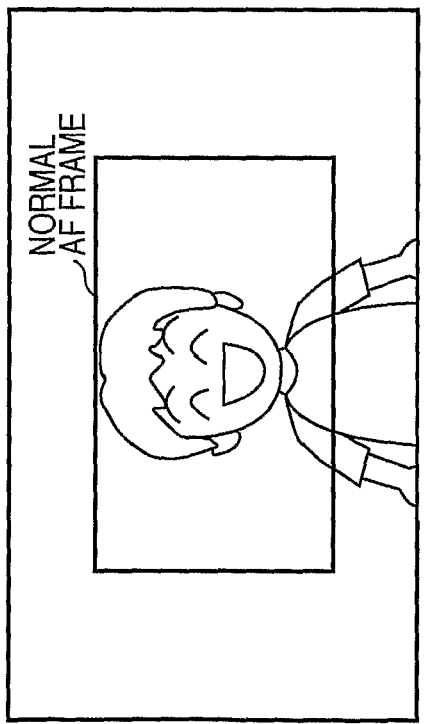
Figure 3D:
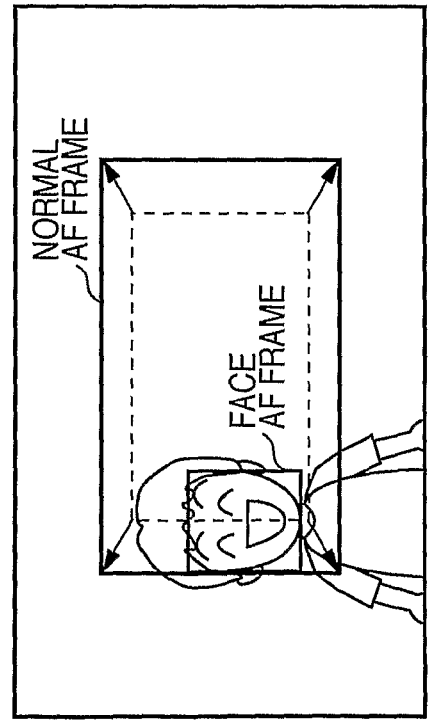

Next, in a case in which the face is no longer detected as shown in FIG. 3C, the use of the face AF frame is stopped. With the normal AF frame maintained as is until a certain period of time has elapsed, the AF evaluation value used is less likely to vary suddenly because the area in which there used to be the face AF frame is contained in the normal AF frame. Next, as shown in FIG. 3D, when the state in which no face is detected continues for the certain period of time, the normal AF frame is reset to the initial size before the face detection, thereby allowing center preference AF to be achieved.

With the frames set as described above, preference is typically given to an object in the center in moving images. Then, in a case in which a face is recognized, the size of the normal AF frame is set and the AF evaluation values for the set normal AF frame and face AF frame are added at a predetermined ratio to carry out AF control based on the resultant AF evaluation value. This allows focusing on a person whose face is recognized, as well as maintaining a stable in-focus state even in a case in which no face is recognized. Specifically, setting the normal AF frame and the face AF frame and adding the AF evaluation values for both frames to use the resultant AF evaluation value allows focusing on an object captured in the normal AF frame even in a case in which the AF evaluation value for the face AF frame shows a result, such as infinity, which is different from the point of focus for the face.

Other Embodiments

In the embodiment described above, the normal AF frame is set to contain the face AF frame and enlarged without changing the center position. However, the present invention is not limited thereto, and thus, for example, as in the following examples (1) to (3) of setting AF frames, a stable in-focus state can also be maintained in moving images by setting a normal AF frame and a face AF frame and carrying out AF control based on the AF evaluation values for both frames.

(1) The normal AF frame is set to contain the entire area from which faces could be detected. This normal AF frame is a fixed area, which is set independently of face detection results. On the other hand, the face AF frame is set at the position of the face in the sensed imaged screen, which is detected by the face recognition processing described previously. More specifically, the ever-changing face AF frame tracking the face and the normal AF frame not tracking the face are set. Thus, the size of the face AF frame with respect to the normal AF frame varies depending on the photographed scenes. In a case in which the size of a face of a main object is smaller, the ratio of the size of the face AF frame to the normal AF frame is smaller. Therefore, the AF evaluation value for the face AF frame has less influence in the case of adding the AF evaluation value for the normal AF frame and the AF evaluation value for the face AF frame. In other words, the face AF frame more slowly reacts to the movement of the main object. On the other hand, in a case in which the size of a face of a main object is larger, the ratio of the size of the face AF frame to the normal AF frame is larger. Therefore, the AF evaluation value for the face AF frame has more influence in the case of adding the AF evaluation value for the normal AF frame and the AF evaluation value for the face AF frame. In other words, the face AF frame more quickly reacts to the movement of the main object.

(2) It is assumed that the normal AF frame will vary in size in multiple stages (for example, a larger frame and a smaller frame). The size of the normal AF frame is switched depending on face detection results (such as the position and size of the face) so as to contain the detected face. Further, the face AF frame is set at the position of the face in the sensed imaged screen, which is detected by the face recognition processing described previously. This setting captures the face of a main object desired by a photographer in the face AF frame, and at the same time reduces failures such as focusing on the background by error because the main object is captured in the normal AF frame even in the case of failing to acquire information indicative of an in-focus state for the face in the face AF frame.

(3) The face AF frame is set at the position of the face in the sensed imaged screen, which is detected by the face recognition processing described previously. It is assumed that the face AF frame is updated in position and size on an as-needed basis while tracking the detected face. Further, the normal AF frame is larger than the face AF frame, and set to contain the face AF frame. This setting captures the face of a main object desired by a photographer in the face AF frame, and reduces failures such as focusing on the background by error because the main object is captured in the normal AF frame even in the case of failing to acquire information indicative of an in-focus state for the face in the face AF frame.

As described above, an in-focus state can be maintained in a case in which face recognition is used to focus on a person as an object in moving images, as well as in a case in which face recognition is not stable, a face area varies, or a face area is small.

It is to be noted that although the detected face is completely contained in the normal AF frame in the embodiment described above, the present invention is not limited to this configuration. For example, when a portion of a face is contained in the normal AF frame, the sharpness (contrast state) in the face can be acquired, thus allowing focusing on a face desired by a photographer.

Further, the moving AF evaluation value generation area of the embodiment is located at the position of the detected face in the sensed image screen in the embodiment. However, specific objects may be detected by other image detection. For example, it is also contemplated that an object image is captured and detected from the background. In addition, positions in the sensed image screen may be input from an external input means, or the line of sight of a photographer looking through a viewfinder may be detected to determine the position in the sensed image screen.

Figure 4:
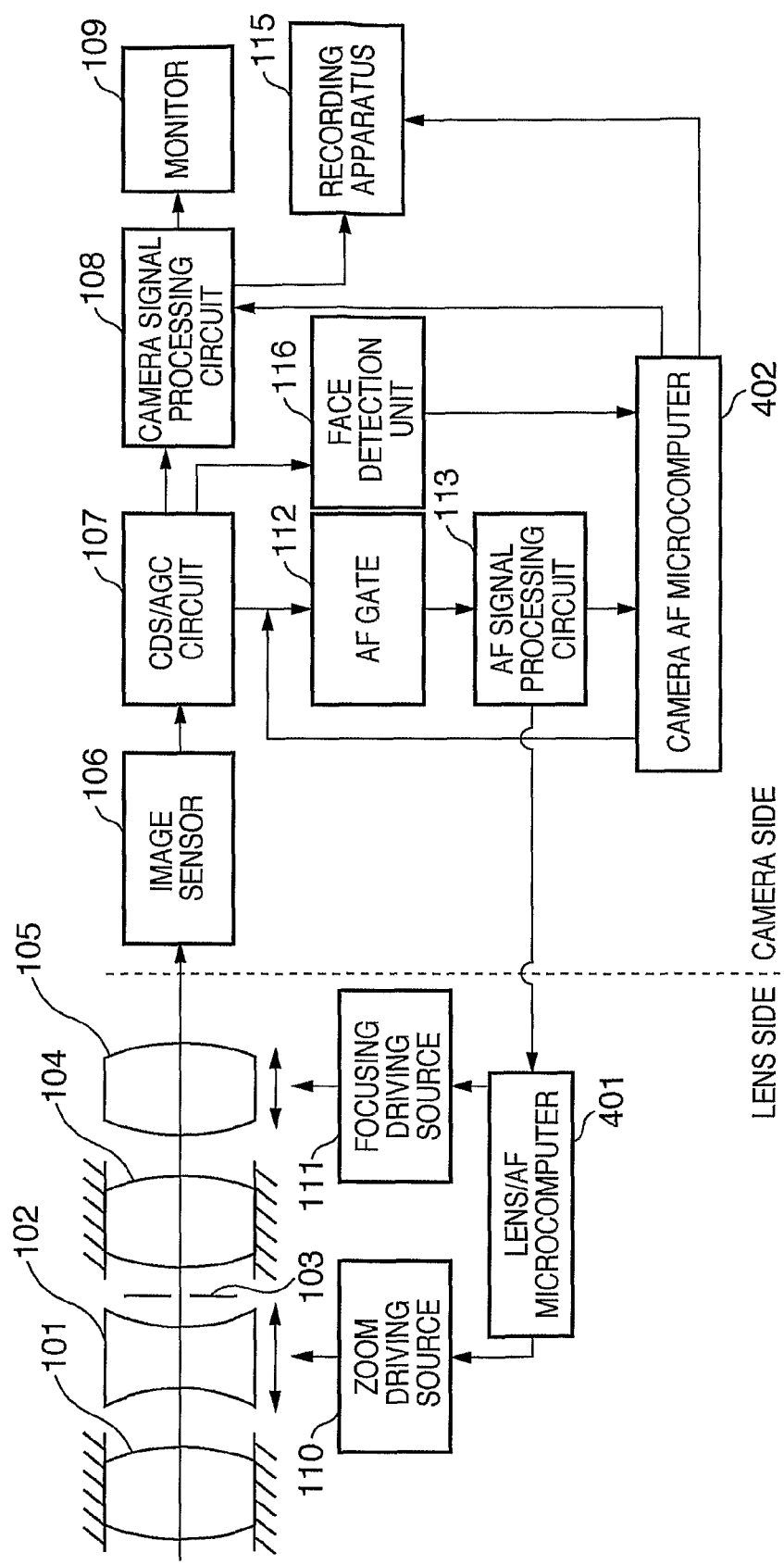
FIG. 4 is a block diagram illustrating the configuration of a video camera with interchangeable lenses.

In addition, the photographing optical system may be interchangeable lenses as shown in FIG. 4. In the example of FIG. 4, an AF evaluation value generated by the AF signal processing circuit 113 is output to a lens/AF microcomputer 401. The lens/AF microcomputer 401, based on the AF evaluation value, executes AF control in which the focusing driving source 111 is controlled to move the focus lens 105 and carry out focus control. Further, a camera microcomputer 402 receives face information of a person in the sensed image screen from the face detection unit 116, and based on the detection result, transmits information to the AF gate 112 such that the area to be used for focus detection is added to the position that includes the face area in the sensed image screen. In this case, the flow of AF control is as follows.

AF control carried out by the lens/AF microcomputer 401 and the camera microcomputer 402 will be described below. This AF control is executed in accordance with computer programs stored in the lens/AF microcomputer 401 and in the camera microcomputer 402.

First, the camera microcomputer 402 takes in face information (the position of a face, the size of the face, and the reliability of the face) from the face detection unit 116.

In a case in which the face detection unit 116 succeeds in face detection, a face AF frame corresponding to the face information detected by the face detection unit 116 and a normal AF frame enlarged in size with its center fixed are set as AF frames (focus detection areas). Then, the AF signal processing circuit 113 acquires AF evaluation values for the face AF frame and the normal AF frame. Then, each AF evaluation value is added at a predetermined ratio to generate an AF evaluation value. Then, this AF evaluation value is transmitted to the lens/AF microcomputer 401. The lens/AF microcomputer 401 uses the received AF evaluation value to carry out AF control.

On the other hand, in a case in which the face detection unit 116 fails to detect the face, it is determined whether or not a certain period of time elapses after failing to recognize the face. In a case in which the certain period of time has not elapsed yet, the normal AF frame is maintained to match the size and location for the case of a previously successful face detection, and an AF evaluation value for the normal AF frame is acquired in the AF signal processing circuit 113. In a case in which the certain period of time has elapsed, the normal AF frame is set to the initial size, and an AF evaluation value for the normal AF frame is acquired. Then, this AF evaluation value is transmitted to the lens/AF microcomputer 401. The lens/AF microcomputer 401 uses the received AF evaluation value to carry out AF control.

It is to be noted that in FIG. 4, the same elements as those in FIG. 1 are denoted by the same reference numerals, and description of the elements is omitted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-181116, filed on Jul. 10, 2007, which is hereby incorporated by reference herein in its entirety.

The invention claimed is:

1. A focus control apparatus comprising:
a detection unit configured to detect an object image to be focused from a sensed image;
a setting unit configured to set an AF evaluation value detection area in the sensed image; and
a focus detection unit configured to acquire an AF evaluation value for adjusting a focus state of a photographing optical system based on a signal output from the AF evaluation value detection area,
wherein the setting unit sets a first AF evaluation value detection area tracking the object image detected by the detection unit and a second AF evaluation value detection area not tracking the object image detected by the detection unit, and
wherein the second AF evaluation value detection area overlaps with the first AF evaluation value detection area, and the focus detection unit carries out computation using signal outputs in the first AF evaluation value detection area and the second AF evaluation value detection area to acquire the AF evaluation value for adjusting the focus state of the photographing optical system; and
wherein, in a case in which a first state in which no object image to be focused is detected by the detection unit changes to a second state in which an object image to be focused is detected by the detection unit, the setting unit enlarges the size of the second AF evaluation value detection area to contain the first AF evaluation value detection area if the size of the second AF evaluation value detection area in the first state is small to contain the detected object image.

2. The focus control apparatus according to claim 1, wherein, in a case in which no object image to be focused is detected by the detection unit, the signal output in the second AF evaluation value detection area is solely used to acquire an AF evaluation value for adjusting the focus state of the photographing optical system, or in a case in which a state in which no object image to be focused is detected by the detection unit moves to a state in which an object image to be focused is detected by the detection unit, computation is carried out using signal outputs in the first AF evaluation value detection area and the second AF evaluation value detection area to acquire the AF evaluation value for adjusting the focus state of the photographing optical system.

3. The focus control apparatus according to claim 1, wherein the second AF evaluation value detection area has a center position fixed.

4. The focus control apparatus according to claim 1, wherein the focus detection unit adds an AF evaluation value generated based on the signal output in the first AF evaluation value detection area and an AF evaluation value generated based on the signal output in the second AF evaluation value detection area at a predetermined ratio to acquire the AF evaluation value for adjusting the focus state of the photographing optical system.

5. The focus control apparatus according to claim 1, wherein the detection unit detects, as the object image to be focused, face information from the sensed image.

6. The focus control apparatus according to claim 1 further comprising:
   the photographing optical system; and
   a control unit configured to control movement of the photographing optical system based on the AF evaluation value for adjusting the focus state of the photographing optical system.

7. An image sensing apparatus comprising:
   an image sensing unit configured to photoelectrically convert an object image formed by the photographing optical system to output a sensed image;
   a recording unit configured to exercise control such that the sensed image obtained by using the image sensing means is recorded on a recording medium; and
   the focus control apparatus according to claim 1.

8. The focus control apparatus according to claim 1, wherein the second AF evaluation value detection area is larger than the first AF evaluation value detection area and contains the first AF evaluation value detection area.

9. The focus control apparatus according to claim 8, wherein, the setting unit maintains the enlarged size of the second AF evaluation value detection area for a predetermined period of time from when the detection unit fails to detect the object image after the object image has been detected.

10. A control method for a focus control apparatus, comprising:
    detecting an object image to be focused from a sensed image;
    setting a first AF evaluation value detection area tracking an object image to be focused detected from a sensed image and a second AF evaluation value detection area not tracking the detected object image; and
    acquiring an AF evaluation value for adjusting a focus state of a photographing optical system by carrying out computation using signal outputs in the first AF evaluation value detection area and the second AF evaluation value detection area,
    wherein the second AF evaluation value detection area overlaps with the first AF evaluation detection area; and
    wherein, in a case in which a first state in which no object image to be focused is detected in the detecting step changes to a second state in which an object image to be focused is detected in the detecting step, the size of the second AF evaluation value detection area is enlarged in the setting step to contain the first AF evaluation value detection area if the size of the second AF evaluation value detection area in the first state is small to contain the detected object image.

* * * * *